United States Patent Office 2,920,631
Patented Jan. 12, 1960

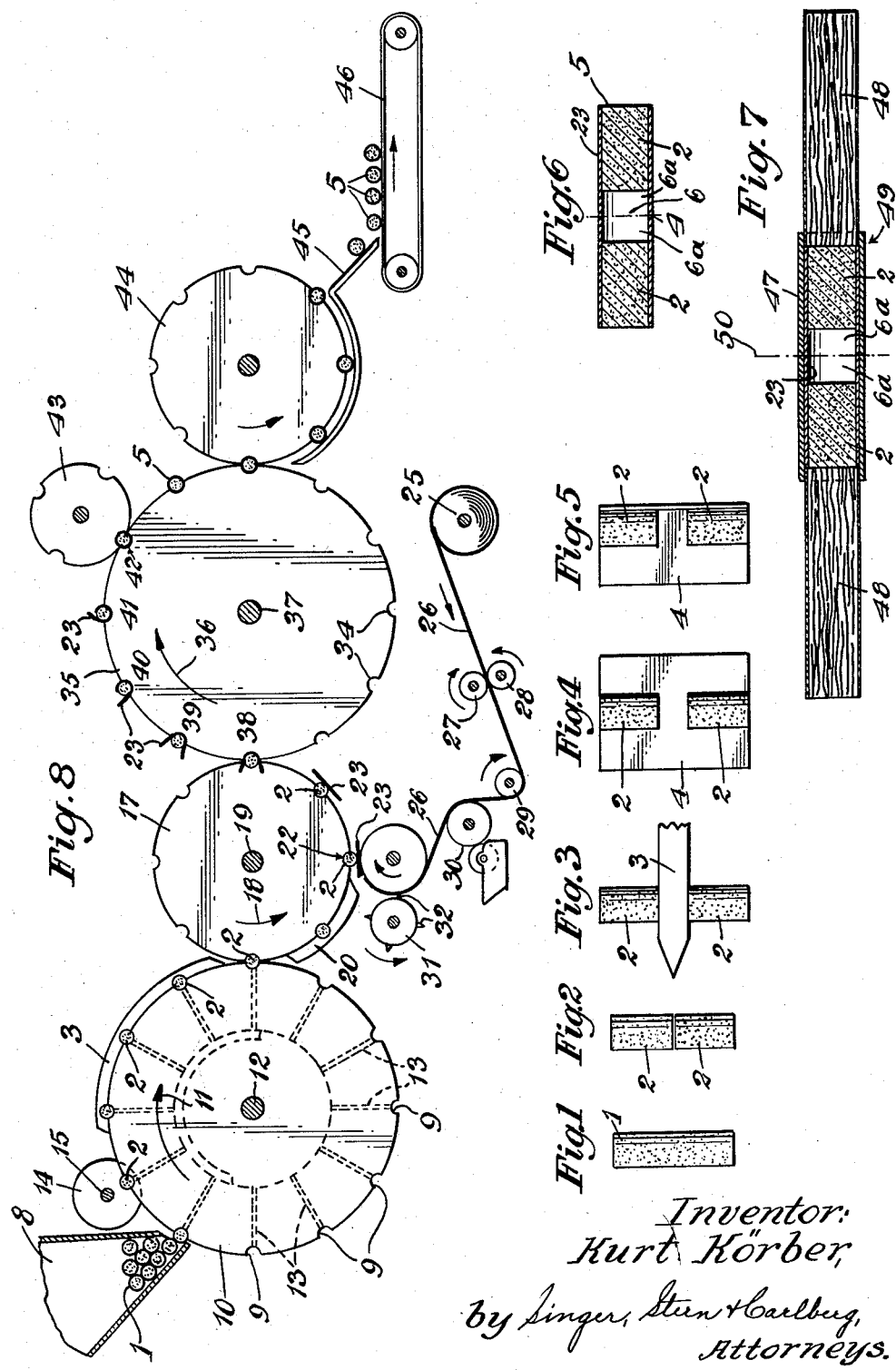

2,920,631

METHOD OF MANUFACTURING HOLLOW TIPPED FILTER TIPS FOR CIGARETTES

Kurt Körber, Hamburg-Bergedorf, Germany, assignor to Kurt Körber & Co. K.G., Hamburg-Bergedorf, Germany Application April 17, 1956, Serial No. 578,637

Claims priority, application Germany April 21, 1955

1 Claim. (Cl. 131—94)

This invention relates to a method of manufacturing filter tips for cigarettes, and more particularly to an improved method of manufacturing hollow tipped filter tips for cigarettes.

It is known that smokers of filter tip cigarettes do not prefer, during smoking, to touch the end of the filter tip that is held in the lips. The reason for this is that deposits accumulate at the end of the filter tip, which are unpleasant to the taste. To avoid this, it has been known to provide hollow tipped filter tips for cigarettes so as to keep the end of the filter away from the end of the cigarette placed in the mouth of the user. Different arrangements were suggested for this purpose. For instance, in one arrangement a small card board tube was arranged about the filter tip associated with the cigarette. In another arrangement, according to the prior art, a paper tube enclosed the filter tip and projected outwardly slightly, forming a hollow tipped filter tip for the cigarette.

The present invention relates to a method of manufacturing filter tips of the last mentioned type. It is known in the art to manufacture such hollow tipped filter tips in a strand process by appropriate machines. Thus, double filter tips are positioned in spaced relation with double the length of the hollow tip transversely onto a paper band. Subsequently lengths of the paper band are glued about the spaced filter tips. Then the group is cut at the spaces between the enclosed filter tips, so that a plurality of hollow tipped filter tips are delivered for further processing.

There are certain disadvantages in the method of production of hollow tipped filter tips according to the above strand process. It is difficult to always position the filter tips at the correct distances upon the paper band, so that variations will occur, resulting in the length of the hollow space in one hollow tipped filter tip being slightly smaller, and the length of the hollow space in another hollow tipped filter tip being slightly longer. These variations in length of the hollow space are noticeable in the finished cigarette. Thus the user looking into the end of the hollow tipped filter cigarette can easily observe such variations of length of the hollow spaces, since such small differences are immediately noticed by the smoker. Moreover the construction of machines for such strand processing of hollow tipped filter tips is very complicated and they require considerable space. In addition, such manufacturing machines are expensive in their price and subsequent upkeep or maintenance.

It is a general object of the present invention to eliminate the above mentioned disadvantages in the manufacture of hollow tipped filter tips.

Another object of the invention is to utilize machines in the manufacture of hollow tipped filter tips, which are well known and used for the uniting of pairs of filter tips in grooves of a conveyor drum for the manufacture of filter tipped cigarettes.

A further object of the present invention is to improvise an improved method of manufacture of hollow tipped filter tips for cigarettes which is quick, efficient and economical in performance.

In the manufacturing process of the present invention there is a difference from the process of manufacturing filter tip cigarettes using filter tips of double length, in that filter tips of double length are taken off of a magazine, placed into grooves of a conveying means, for instance, a conveyor drum, separated into two equal parts, pushed apart by a distance equal to twice the length of the desired hollow space, and are then wrapped together by connecting leaves in a manner known from the manufacture of filter tip cigarettes.

Filter rods of double finished length of the filter tip can be easily removed from a storage chamber or a magazine and deposited into the grooves of a conveyor drum. The double filter tip group manufactured in accordance with the present invention is preferably enclosed along its total length by a connecting leaf made of relatively stiff paper, and is divided in the middle only, after cigarettes are secured to each end of the filter tip group during the manufacturing process of the completed filter tip cigarettes.

Further objects and advantages will readily become apparent upon reading the following specification, taken in conjunction with the drawings, in which:

Fig. 1 illustrates a filter tip rod of double finished length;

Fig. 2 shows the filter tip rod of Fig. 1 after it has been divided;

Fig. 3 shows the divided filter tip rod being separated twice the length of the finished hollow space by a wedge-shaped guiding rail;

Fig. 4 illustrates the spaced filter tips in the process of being wrapped by a connecting leaf;

Fig. 5 shows one flap of the connecting leaf being folded about the spaced filter tips.

Fig. 6 shows the wrapped, spaced filter tip group;

Fig. 7 shows the filter tip group of Fig. 6 following attachment thereto of two cigarettes, and prior to the final cutting operation; and Fig. 8 diagrammatically illustrates the method and a possible machine for carrying out said method of the present invention for manufacturing hollow tipped filter tips for cigarettes.

Referring to the drawing, and more particularly to Fig. 1 thereof, the reference numeral 1 designates a filter tip rod of twice the finished length. Fig. 2 illustrates the filter tip rod 1 of Fig. 1 following its division in half into two equal parts 2, each of which constitutes a filter tip of finished length. Fig. 3 shows the separation of the two filter tips 2 a distance apart equal to twice the length of the hollow space in the finished hollow tipped filter tip. This separation is accomplished by a stationary wedge-shaped guide rail 3, which is disposed between the filter tips 2 as they collectively are carried along by a conveying means, hereinafter described.

Fig. 4 shows the properly spaced filter tips 2 in the process of being wrapped or enclosed by a connecting leaf 4. Part of the wrapping process is completed in Fig. 5, which shows one flap of the connecting leaf 4 wrapped into position. Fig. 6 shows somewhat enlarged the connected, or wrapped filter tip group, designated generally by the reference numeral 5, with the filter tips 2 maintained the correct distance apart by the connecting leaf 4. This spacing distance results in a hollow space 6 provided between the two filter tips 2, such hollow space 6 being twice the length of the hollow space associated with each filter tip in the finished cigarette.

Referring now to Fig. 8, which diagrammatically represents a machine carrying out the aforesaid method steps, it will be noted that the filter tip rods 1, of double finished length, are removed from a storage chamber, or magazine 8. They are attracted into grooves 9 of a conveyor drum 10, which rotates in the direction of the arrow 11. As shown, the grooves 9 are provided on the conveyor drum 10 in a direction parallel to the axis 12 of the drum 10. The filter tip rods 1 are attracted into the grooves 9 of the rotating drum 10 by a partial vacuum established through passages 13 communicating with the bottom of the grooves 9.

The filter tip rods 1, carried by the conveyor drum 10, are divided, or cut (Fig. 2) by a stationarily mounted cutting disc 14, which rotates abouts its axis 15. The resulting filter tips 2 are pushed apart, or separated by a stationarily mounted wedge-shaped guiding rail 3 (Fig. 3) a distance which corresponds to twice the length of the hollow space 6a of the finished hollow tipped filter tip.

The filter tips 2 are then transferred to a second conveyor drum 17, rotatable in the direction 18 about a center 19. The conveyor drum 17 is preferably geared to the conveyor drum 10, by means not shown, so that both drums rotate in unison. A stationary guiding wedge 20 functions over a short circumferential travel of the drum 17 to prevent the filter tips 2 from moving closer to each other, and assists them in maintaining their correct spacing. This spacing does not vary from group to group.

At the position 22, the filter tips 2, which are spaced the correct distance apart, are fastened to each other by a glued connecting leaf 23. This is provided from a storage roll 25 of connecting leaves 26. The connecting leaf 26 is guided by rollers 27—29, and is coated with glue on one side by a guling device 30. A cutting roller 31, with spaced cutting blades 32 rotates to cut predetermined lengths 23 of connecting leaf. As mentioned before, these lengths of connecting leaves 23 come into engagement at position 22 with the moving, spaced pairs of filter tips 2.

Following the enclosing of the filter tip pairs 2 by the connecting leaves 23, the distance of sparation between the filter tips 2 is thereafter maintained. In a further conveying movement, the so formed filter tip group 5 (Fig. 6) comprising the two spaced filter tips 2 disposed a fixed distance apart from each other by the connecting leaf 23, is transferred to the grooves 34 of a wrapping drum 35. The wrapping drum 35 rotates in the direction 36 about a center 37. Preferably gear means, not shown, are employed to effect simultaneous rotation of the drums 17 and 35. Along the positions 38—41, suitable means not shown, is provided to effect a folding, or wrapping, of the flaps of the connecting leaf 23 about the spaced filter tips 2. At the position 42 a grooved pressing drum 43 may be employed to effect a firm attachment of the flaps of the connecting leaves 23.

The filter tip groups 5 (Fig. 6), comprising the two spaced filter tips 2 with a hollow space 6 therebetween, which corresponds to double the length of the finished hollow spaces 6a, are then transferred onto a further conveying drum 44. Here they pass over a collecting plate 45 upon a conveying belt 46, from whence they can be used for further manufacturing processes.

It may be observed that the connecting leaf 23 wrapped around the filter tips 2 need not necessarily be very thick, or of stiff material, since in the subsequent manufacturing processes of the completed filter tip cigarettes, a second connecting leaf 47 (Fig. 7) is used. Thus, in order to secure cigarettes 48 to the filter tip group 5, a second glued connecting leaf 47 is wrapped about the filter tip group 5 and also about a slight length of the adjacent cigarettes 48 as shown in Fig. 7. When the resulting grouping 49 is cut in half at 50, hollow spaces 6a will be provided on both cigarettes at the filter tip ends of the completed cigarettes. Because of the use of two connecting layers, or leaves 23, 47 there is provided sufficient stiffness for the walls of the hollow spaces 6a, so that during normal smoking, the lips of the user will not press the filter tip covering together.

From the foregoing description it will be apparent that I have provided an improved method of making hollow tipped filter tips for cigarettes, which method is rapid, efficient and economical in that already existing machines may be employed in my improved process.

Although I have shown and described an improved process of making hollow tipped filter tips for cigarettes it is to be clearly understood that the same was merely for the purpose of illustration, and that changes and modifications may readily be made therein by those skilled in the art without departing from the spirit any scope of the present invention.

What I claim as my invention is:

The method of manufacturing recessed filter tip cigarettes from filter rod material and cigarette lengths, comprising moving a plurality of round filter bodies of double length along a circular pathway in a direction transverse to the axis of the filter body, cutting the filter bodies of double length in half by a cutting means during the movement of the filter tips along said circular pathway, separating the two halves by a stationary spacing wedge positioned in said pathway a distance apart equal to substantially twice the length of the recess space to be formed in the finished filter tip cigarette, transferring the spaced filter tip halves to a second circular pathway to move in a direction transverse of their axis while maintaining said spacing, applying glue to one side of a strip of connecting leaf material fed from a supply roll, cutting predetermined lengths of material from said strip having one side coated with glue to form individual connecting leaves, contacting and causing said lengths of connecting leaf material to adhere to the spaced filter body halves moving along said second circular pathway, wrapping the lengths of connecting leaf about said axially spaced filter tip halves to form filter tip groups having a hollow void space intermediate their ends, abutting two cigarette lengths to the exposed ends of the filter group, wrapping a second leaf around the composite cigarette filter and cigarettes, and finally cutting the recessed filter cigarette groups in half through the void formed by said hollow space to thereby provide pairs of finished recessed filter tip cigarettes.

References Cited in the file of this patent

UNITED STATES PATENTS

| 2,205,943 | Davidson | June 25, 1940 |
| 2,649,761 | Edwards | Aug. 25, 1953 |
| 2,740,409 | Korber | Apr. 3, 1956 |

FOREIGN PATENTS

| 428,549 | Great Britain | May 15, 1935 |
| 430,786 | Great Britain | June 21, 1935 |
| 814,721 | Germany | Sept. 24, 1951 |
| 1,098,950 | France | Mar. 16, 1955 |